United States Patent Office 3,803,149
Patented Apr. 9, 1974

3,803,149
5-PIPERAZINYL-10-DIOXO-DIBENZO(c,f)THIAZE-
PINES AND PROCESS FOR MAKING THEM
Charles Malen, Fresnes, and Michel Laubie, Vaucresson, France, assignors to Science Union et Cie, Societe Francaise de Recherche Medicale, Suresnes, France
No Drawing. Original application Dec. 13, 1967, Ser. No. 690,091, now Patent No. 3,657,276, dated Apr. 18, 1972. Divided and this application June 29, 1971, Ser. No. 158,074
Claims priority, application Great Britain, Dec. 19, 1966, 56,720/66
Int. Cl. C07d 51/70
U.S. Cl. 260—268 TR    5 Claims

ABSTRACT OF THE DISCLOSURE

Dibenzo (c,f) thiazepines (1,2) wherein the two benzene nuclei may be substituted by halogen or lower-alkyl or loweralkoxy having up to 5 carbon atoms inclusive, the nitrogen atom is substituted by lower-alkyl having up to 5 carbon atoms inclusive, and the thiazepine bears in position 5 an optionally substituted piperazine radical or an oxy- or thio-alkyleneamino radical, and acid addition salts thereof, having hypotensive, bronchodilator and diuretic activity.

CROSS REFERENCE TO RELATED APPLICATIONS

This application is a division of U.S. Ser. No. 690,091 filed on Dec. 13, 1967, now U.S. Pat. No. 3,657,276.

The present invention provides new dibenzo (c,f) thiazepine (1,2) compounds of the general formula

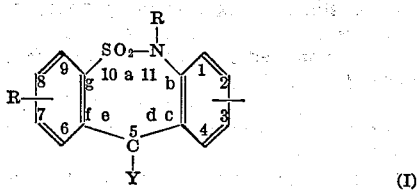

(I)

in which
A and B are identical or different and each represents hydrogen or halogen, lower-alkyl containing up to 5 carbon atoms, inclusive, or lower-alkoxy containing up to 5 carbon atoms, inclusive,
R represents lower-alkyl containing up to 5 carbon atoms, inclusive,
Y represents
  (a) a piperazinyl radical of the general formula

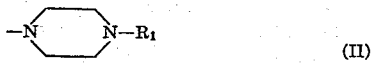

(II)

where $R_1$ stands for hydrogen or a linear or branched-chain alkyl or hydroxyalkyl radical containing up to 5 carbon atoms inclusive, a pyrimidyl radical, an aralkyl radical such, for example, as a benzyl or phenyl, phenylethyl, or phenpropyl radical, or a substituted aralkyl radical such, for example, as a piperonyl, anisyl, or homo-anisyl radical, said aralkyl radicals containing up to a maximum of nine carbon atoms, or
  (b) an oxyalkyleneamino or thioalkyleneamino radical of the general formula

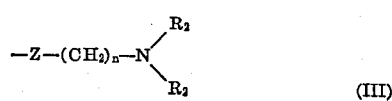

(III)

where
Z represents oxygen or sulphur,
$R_2$ represents lower-alkyl with up to 3 carbon atoms, inclusive, or forms together with a nitrogen atom a hexamethyleneimine, piperidine, or pyrrolidine heterocyclic ring, and wherein $n$ is the integer 2, 3, 4 or 5.

The present invention includes in addition to the dl forms of the compounds of the General Formula I and their d and l optical isomers, the acid addition salts of these compounds derived from mineral or organic acids. Examples of suitable mineral acids are hydrochloric, hydrobromic, isethionic, sulphuric, phosphoric and sulphamic acid. Suitable organic acids are, for example, acetic, propionic, maleic, fumaric, tartaric, citric, oxalic, benzoic, and methanesulphonic acids.

The new compounds of this invention and their physiologically tolerable acid addition salts possess valuable pharmacological and therapeutic properties and may, therefore, be used as antihypertensive (hypotensive), vasodilatory, cardio-stimulating, bronchodilatory, respiration-stimulating, diuretic, spasmolytic or antihistaminic medicaments.

The new derivatives of the General Formula I, in which A, B and R have the meanings defined above and wherein Y represents a piperazinyl radical of the General Formula II, may be manufactured by condensing a 5-chloro-10-dioxo-11-alkyl-dibenzo (c,f) thiazepine (1,2) of the general formula

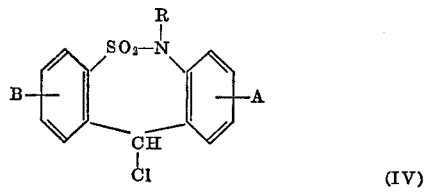

(IV)

in which A, B and R have the above meanings, with a piperazine of the general formula

(V)

in which $R_1$ has the above meaning. This condensation is advantageously carried out in an anhydrous organic solvent such as, for example, a hydrocarbon or an ether, at a temperature ranging from 20 to 100° C.

One form of the process for the manufacture of the compounds of the General Formula I in which Y stands for a piperazinyl radical of the General Formula II wherein $R_1$ is a substituent other than a hydrogen atom, comprises reacting a corresponding compound in which $R_1$ represents a hydrogen atom with a halogenated compound of the general formula

$R_1$—X    (VI)

where X represents a halogen atom and $R_1$ has one of the meanings given above other than a hydrogen atom.

The new compounds obtaind in this manner are bases which generally form white crystals having a sharp melting point, and in acetic acid solution they react with perchloric acid either as mono-basic or as di-basic compounds. These compounds form well-defined salts with mineral and organic acids. However, in a strongly aqueous acid medium a certain instability of both the base and its salts and a general tendency to solvation of both are observed.

The new compounds of the General Formula I, in which A, B and R have the above meanings and Y represents an oxyalkyleneamino or thioalkyleneamino radical of the General Formula III, are obtainable by condensing a 5-chloro-10-dioxo-11-alkyl-dibenzo (c,f) thiazepine (1, 2) of the General Formula IV with a sodium salt of a dialkylamino alcohol or a dialkylaminothiol of the general formula

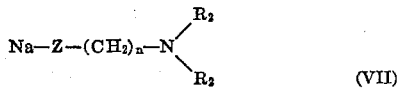
(VII)

in which Z, $R_2$ and $n$ have the above meanings. This condensation is carried out in an anhydrous organic solvent, for example, in a hydrocarbon.

The new compounds obtained in this manner are bases which are generally oily, do not crystallize, and are soluble in aqueous mineral or organic acids. Their organic salts, on the other hand, in general form well defined crystals, but when melted they decompose. These salts can be determined with perchloric acid in an acetic acid medium. The 5-chloro-10-dioxo-11-alkyl-dibenzo (c,f) thiazepine (1,2) of the General Formula IV, which is used as starting material for the syntheses referred to above, belongs to a new heterocyclic system based on the nucleus of 5-H,11-H-dibenzo (c,f) thiazepine (1,2). All compounds stemming from this basic nucleus are, therefore, new. This is particularly true of 5-chloro-10-dioxo-11-alkyl-dibenzo (c,f) thiazepine (1,2) of the General Formula IV, which has been obtained by the following route:

An ortho-carbomethoxybenzene sulphochloride of the general formula

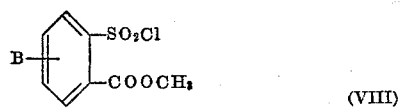
(VIII)

in which B has the above meanings, prepared by the method of H. Meerwein et al. [Berichte 90, pp. 841–852 (1957)] or by the method of U.S. Pat. 2,667,503, is condensed in an aqueous alkaline or hydroalcoholic medium or in a tertiary organic base with an N-monoalkylaniline which is substituted and corresponds to the general formula

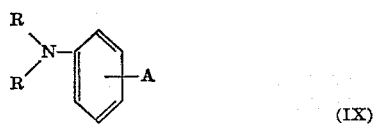
(IX)

(where R and A have the above meanings) to form a compound of the general formula

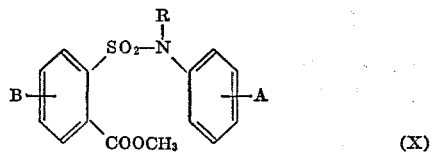
(X)

According to another form of the process for the manufacture of compounds of the Formula X, a compound of the Formula X, in which R represents a hydrogen atom, is reacted with a conventional alkyl halide.

The methyl ester of the General Formula X is first transformed by hydrolysis into a carboxylic acid and then into the acid chloride by means of a chlorinating agent, for example thionylchloride in a hydrocarbon. This acid chloride is cyclized in an inorganic or organic solvent (for example, in carbon disulphide, methylene chloride or benzene) by means of a conventional cyclizing agent, such, for example, as aluminum chloride, to give rise to a new compound, 10-dioxo-11-alkyl-dibenzo (c,f) thiazepine (1,2)-5-one, of the general formula

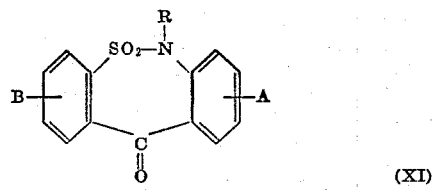
(XI)

in which A, B and R have the meanings defined above.

When this new compound of the General Formula XI is reduced by means of a classical reducing agent such, for example, as an alkali metal borohydride in an alcoholic medium, it gives rise to the corresponding 10-dioxo-11-alkyl-dibenzo (c,f) thiazepine (1,2)-5-ol compound which, in a solution in a suitable organic solvent such, for example, as a chlorinated solvent, on treatment with hydrogen chloride gas yields a new compound, 5-chloro-10-dioxo-11-alkyl-dibenzo (c,f) thiazepine-(1,2), of the General Formula IV.

The new compounds of this invention and their acid addition salts may, if desired, be purified by classical physical or chemical methods.

The melting points are determined on a Kofler heater plate, under the microscope (M.K.) or on a Kofler bank (B.K.).

The following examples illustrate the invention, but are not to be construed as limiting.

Example 1: 10-dioxo-11-methyl-dibenzo (c,f) thiazepine (1,2)-5-one

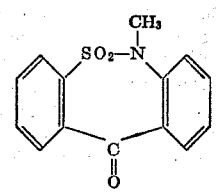

Methyl ester: (1) 234.5 grams of ortho-carbomethoxybenzene sulphochloride (melting point 64–65° C. (BK)) are gradually added to a solution of 115 grams of N-methylaniline in 300 ml. of pyridine. From the start of this addition a deep red coloration develops. On completion of the addition the reaction mixture is heated for 45 minutes at 60° C.

While still hot, the reaction product is poured over 2 kg. of ice. After suction filtering and washing with water, there are obtained 287 grams of a crude product melting at 80 to 92° C. (BK).

After recrystallization from 0.5 liter of ethanol, there are obtained 263 grams of a pure product melting at 90 to 92° C. (BK).

Acid: (2) The methyl ester thus obtained is suspended in 0.5 liter of absolute ethanol and a solution of 59 grams of potassium hydroxide in 200 ml. of water is added.

The whole reaction mixture is then refluxed for 90 minutes, cooled, one liter of water is added, and the mixture is acidified to pH=1 and extracted with ether.

The ethereal solutions are washed with water, dried, and concentrated to yield 212 grams of a crude acid melting to 80 to 84° C. (BK). This acid may be conveniently recrystallized from cyclohexane, although it is equally suitable for the following synthesis as it is obtained.

Acid chloride: (3) 15.75 grams of the above acid are dissolved with heating in 60 ml. of benzene. In the course of 15 minutes, 8.8 ml. of thionylchloride are added and the mixture is refluxed for two hours. The resulting clear solution is evaporated to dryness with exclusion of humidity. The residue comprises the crude acid chloride, which is dissolved in 120 ml. of anhydrous carbon disulphide, to which, while agitating the whole reaction mixture well while keeping out moisture, 20 grams of powdered aluminum chloride are added in portions.

The reaction is slightly exothermic. Fifteen minutes after completion of the addition of aluminum chloride, the mixture is heated to reflux and thus maintained for one hour. After cooling, the solvent is decanted, whereafter the residue is hydrolyzed with 200 grams of ice and extracted with chloroform. The organic layers are washed with dilute hydrochloric acid, then with water, then with soda solution, and finally with water.

The whole reaction product is dried and the solvent evaporated. The residue yields, on recrystallization from 320 ml. of absolute ethanol, 9.5 grams of 10-dioxo-11-methyl-dibenzo (c,f) thiazepine (1,2)-5-one, which melts with sublimation at 157 to 158° C. (MK). The structure of this compound has been established by its infra red spectrum and the nuclear magnetic reasonance spectrum.

The infra-red spectrum of 10-dioxo-11-methyl-dibenzo (c,f) thiazepine (1,2)-5-one, in a suspension in a mineral oil mull (Nujol-TM), on a Perkin 221 (TM) infra-red spectrometer, shows a carbonyl band at 1650 cm.$^{-1}$ and the symmetrical and asymmetrical frequency bands of $SO_2$ at 1185 cm.$^{-1}$ and 1340 cm.$^{-1}$.

The nuclear magnetic resonance spectrum of 10-dioxo-11-methyl-dibenzo (c,f) thiazepine (1,2)-5-one shows a singlet at 3.3 p.p.m. corresponding to three protons ($N-CH_3$) and a double complex pattern between 7 and 8 p.p.m., corresponding to two groups of 4 aromatic protons.

The following compounds were obtained by the same process:

(a) 10-dioxo-11-ethyl-dibenzo (c,f) thiazepine (1,2)-5-one, melting at 163–164° C. (MK) with sublimation.

(b) 1-chloro-10-dioxo-11-methyl-dibenzo (c,f) thiazepine (1,2)-5-one, solvated with a benzene molecule, melting at 147–150° C. (MK).

(c) 2-chloro-10-dioxo-11-methyl-dibenzo (c,f) thiazepine (1,2)-5-one, melting at 152–154° C. (MK).

(d) 3-chloro-10-dioxo-11-methyl-dibenzo-(c,f) thiazepine (1,2)-5-one, melting at 191-192° C. (BK).

(e) 2-methoxy-10-dioxo-11-methyl-dibenzo (c,f) thiazepine (1,2)-5-one, melting at 170–172° (BK) with sublimation.

(f) 3-methoxy-10-dioxo-11-methyl-dibenzo (c.f) thiazepine (1,2)-5-one, melting at 150 to 153° C. (BK).

(g) 4-methoxy-10-dioxo-11-methyl-dibenzo (c.f) thiazepine (1,2)-5-one, melting at 224 to 225° C. (BK) with sublimation.

(h) 4-hydroxy-10-dioxo-11-methyl-dibenzo (c,f) thiazepine (1,2)-5-one, melting at 156 to 157° C. (BK).

(i) 10-dioxo-11-n.propyldibenzo (c,f) thiazepine (1,2)-5-one, melting at 113–114° C. (MK).

(j) 8-chloro-10-dioxo-11-methyl-dibenzo (c,f) thiazepine (1,2)-5-one, melting at 174–175° C. (MK).

(k) 7-chloro-10-dioxo-11-methyl-dibenzo (c,f) thiazepine (1,2)-5-one, melting at 162–163° C. (BK).

(l) 2,8-dichloro-10-dioxo-11-methyl-dibenzo (c,f) thiazepine (1,2)-5-one melting at 197–200° C. (MK).

(m) 3,8-dichloro-10-dioxo-11-methyl-dibenzo (c,f) thiazepine (1,2)-5-one, melting at 191–193° C. (MK).

Example 2: 10-dioxo-11-methyl-dibenzo (cf) thiazepine (1,2)-5-ol

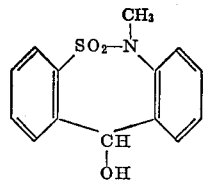

Three hundred mg. of sodium borohydride are gradually added to an agitated suspension of 1.36 grams of 10-dioxo-11-methyl-dibenzo (c,f) thiazepine (1,2)-5-one in 5 ml. of methanol. The agitation is continued for 45 minutes after completion of the addition, and the batch is then heated at reflux for one hour, diluted with 20 ml. of water, and the reaction product suctioned off, washed with water, dried and recrystallized from 8 ml. of normal propanol, to yield 1.15 grams of 10-dioxo-11-methyl-dibenzo (c,f) thiazepine (1,2)-5-ol, melting at 138 to 140° C. (MK).

The structure of this compound has been determined by its infra-red and nuclear magnetic resonance spectra. The infra-red spectrum of 10-dioxo-11-methyl-dibenzo (c,f) thiazepine (1,2)-5-ol, suspended in a mineral oil mull (Nujol-TM), on a Perkin 221 (TM) infra-red spectrometer, contains a narrow and substantial band attributable to the hydroxy function at 3485 cm.$^{-1}$ and a very attenuated band corresponding to the vibration of $SO_2$.

The nuclear magnetic resonance spectrum of 10-dioxo-11-methyldibenzo (c,f) thiazepine (1,2)-5-ol contains a singlet at 3.2 p.p.m. corresponding to three protons ($N-CH_3$), a doublet at 4.4 to 4.6 p.p.m corresponding to the proton CH, a second doublet at 5.9 to 6.1 p.p.m. corresponding to the hydroxyl proton, and a double complex pattern between 7.2 and 8 p.p.m. corresponding to 8 aromatic protons.

By the same process the following were prepared:

(a) 10-dioxo-11-ethyl-dibenzo (c,f) thiazepine (1,2)-5-ol, melting at 126 to 127° C. (MK).

(b) 2-chloro-10-dioxo-11-methyl-dibenzo (c,f) thiazepine (1,2)-5-ol, melting instantaneously at 140° C. (BK).

(c) 3-chloro-10-dioxo-11-methyl-dibenzo (c,f) thiazepine (1,2)-5-ol, melting at 138 to 143° C. (BK).

(d) 2-methoxy-10-dioxo-11-methyl-dibenzo (c,f) thiazepine (1,2)-5-ol, melting at 145 to 146° C. (BK).

(e) 4-methoxy-10-dioxo-11-methyl-dibenzo (c,f) thiazepine (1,2)-5-ol, melting at 179 to 182° C. (BK).

(f) 10-dioxo - 11 - n.propyl-dibenzo (c,f) thiazepine (1,2)-5-ol (oil).

(g) 8-chloro-10-dioxo-11-methyl-dibenzo (c,f) thiazepine (1,2)-5-ol, melting at 197.5 to 200° C. (MK).

(h) 7-chloro-10-dioxo-11-methyl-dibenzo (c,f) thiazepine (1,2)-5-ol, melting at 191–193° C. (BK).

(i) 2,8-dichloro-10-dioxo-11-methyl-dibenzo (c,f) thiazepine (1,2)-5-ol, melting at 160–165° C. (BK).

(j) 3,8-dichloro-10-dioxo-11-methyl-dibenzo (c,f) thiazepine (1,2)-5-ol, melting at 189–192° C. (MK).

Example 3: 5-chloro-10-dioxo-11-methyl-dibenzo (c,f) thiazepine (1,2)

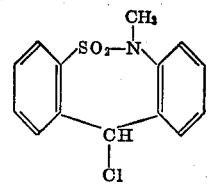

A solution of six grams of 10-dioxo-11-methyl-dibenzo (c,f) thiazepine (1,2)-5-ol in 30 ml. of chloroform is saturated at 15° C. or below with hydrochloric gas. The whole reaction mixture is further kept in contact with HCl for 15 minutes, and the solvent is then evaporated. The residue is recrystallized from 80 ml. of 1,2-dichloroethane, to yield 4.7 grams of 5-chloro-10-dioxo-11-methyldibenzo (c,f) thiazepine (1,2), which melts at 242 to 244° C. (BK) with sublimation and decomposition.

(a) 5-chloro-10-dioxo-11-n.propyl-dibenzo (c,f) thiazepine (1,2), melting instantaneously at 132° C. with decomposition (BK).

(b) 5,8-dichloro-10-dioxo - 11 - methyl-dibenzo (c,f) thiazepine (1,2), melting at 260° C. with decomposition (BK).

(c) 5,7-dichloro-10-dioxo - 11 - methyl-dibenzo (c,f) thiazepine (1,2), melting at 195° C. with decomposition (BK).

(d) 3,5,8 - trichloro-10-dioxo-11-methyl-dibenzo (c,f) thiazepine (1,2), melting at 220° C. with decomposition (BK).

Example 4: *dl*-5-[(4'-methyl) piperazin-1'-yl]-10-dioxo-11-methyl-dibenzo (c,f) thiazepine (1,2)

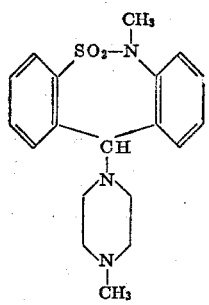

N-methylpiperazine (5.94 grams) in 10 ml. of anhydrous nitromethane is added dropwise with agitation to a suspension of 8.8 grams of 5-chloro-10-dioxo-11-methyl-dibenzo (c,f) thiazepine (1,2) in 50 ml. of anhydrous nitromethane. The ensuing reaction is slightly exothermic and the temperature rises to 32° C. On completion of this exothermic reaction, the batch is heated for 30 minutes at 50° C. and is then evaporated to dryness under vacuum.

The residue is taken up with 25 ml. of water and then with 15 ml. of N-hydrochloric acid, heated to boiling, filtered, and the filtrate is cooled and suctioned to yield 9 grams of the monohydrochloride of *dl*-5-[(4'-methyl) piperazin-1'-yl]-10-dioxo-11-methyl-dibenzo (c,f) thiazepine (1,2), melting with sublimation at 250–260° C. (BK). These 9 grams of monohydrochloride can be recrystallized from 50 ml. of water. Yield: 70%.

When a specimen of this hydrochloride is treated with sodium carbonate, it furnishes the corresponding base in the form of white crystals which can be recrystallized from benzene and which melt at 215 to 218° C. (BK).

By the same process the following were produced:

(a) *dl*-5-[(4'-piperonyl) piperazin-1'-yl]-10-dioxo-11-methyl-dibenzo (c,f) thiazepine (1,2), whose monohydrochloride melts instantaneously at 260° C. (BK).

(b) *dl*-5-[(4'-ethyl) piperazin-1'-yl]-10-dioxo-11-methyl-dibenzo (c,f) thiazepine (1,2), whose monohydrochloride decomposes above 231° C. (BK).

(c) *dl*-3-chloro-5-[(4' - methyl) piperazin-1'-yl]-10-dioxo-11-methyl-dibenzo (c,f) thiazepine (1,2), melting at 228.5–229.5° C. (MK), and whose acid maleate melts instantaneously at 185° C. (BK) with decomposition.

(d) *dl*-2-chloro-5-[(4'-methyl) piperazin-1'-yl]-10-dioxo-11-methyl-dibenzo (c,f) thiazepine (1,2), melting at 238 to 240° C. (MK).

(e) *dl*-5-[(4'-butyl) piperazin-1'-yl]-10-dioxo-11-methyl-dibenzo (c,f) thiazepine (1,2), melting at 156–157° C. (BK).

(f) *dl*-2-chloro-5-[(4'-ethyl) piperazin-1'-yl]-10-dioxo-11-methyl-dibenzo (c,f) thiazepine (1,2), melting at 218–222° C. (BK).

(g) *dl*-5-[(4'-pyrimid - 2'' - yl) piperazin-1'-yl]-10-dioxo-11-methyl-dibenzo (c,f) thiazepine (1,2), melting at 234–236° C. (BK).

(h) *dl*-5-[(4' - methyl) piperazin-1'-yl]-10-dioxo-11-ethyl-dibenzo (c,f) thiazepine (1,2), melting at 198–199° C. (BK).

(j) *dl*-5-[(4' - beta-hydroxyethyl)piperazin - 1' - yl]-10-dioxo-11-methyl-dibenzo (c,f) thiazepine (1,2), which melts instantaneously at 194° C. (BK).

(j) *dl*-5-[(4'-benzyl)piperazin - 1' - yl]-10 - dioxo-11-methyl-dibenzo (c,f) thiazepine (1,2), melting at 158–161° C. (MK).

(k) *dl*-5-[(4'-methyl)piperazin - 1' - yl]-10 - dioxo-11-n.propyl-dibenzo (c,f) thiazepine (1,2), whose acid maleate melts instantaneously at 218° C. with decomposition.

(l) *dl*-5-[(4'-methyl)-piperazin - 1' - yl] - 8 - chloro-19-dioxo-11-methyl-dibenzo (c,f) thiazepine (1,2), whose acid maleate melts at 185–188° C. (BK).

(m) *dl*-5-(piperazin-1'-yl) - 8 - chloro-10-dioxo-11-methyl-dibenzo (c,f) thiazepine (1,2), whose acid maleate melts at 180° C. (BK) with decomposition.

(n) *dl*-3,8-dichloro - 5 - [(4'-methyl)-piperazin-1'-yl]-10-dioxo-11-methyl-dibenzo (c,f) thiazepine (1,2), whose acid maleate melts instantaneously at 190° C. (BK) with decomposition.

(o) *dl*-5-[(4'-methyl)-piperazin - 1' - yl]-7-chloro-10-dioxo-11-methyl-dibenzo (c,f) thiazepine (1,2), whose acid maleate melts instantaneously at 240° C. with decomposition.

(p) *dl*-2,8-dichloro-5-[(4'-methyl)piperazin - 1' - yl]-10-dioxo-11-methyl-dibenzo (c,f) thiazepine (1,2), whose acid maleate melts instantaneonsly at 160° C. (BK) with decomposition.

Example 5: *dl*-5-piperazin-1'-yl-10-dioxo-11-methyl dibenzo (c,f) thiazepine (1,2)

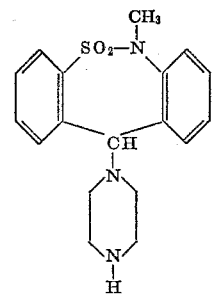

With vigorous agitation, 12.9 grams of solid 5-chloro-10-dioxo-11-methyl-dibenzo (c,f) thiazepine (1,2) in the pulverulent state are added at 60° C. portionwise to a solution of 18.8 grams of anhydrous piperazine in 100 ml. of dry benzene and, after completion of addition, the batch is agitated for another hour and then evaporated to dryness. The residue is taken up with 200 ml. of water and 20 ml. of concentrated hydrochloric acid. A small quantity of undissolved matter is filtered off, and the acid filtrate is treated with sodium hydroxide. The precipitate is suctioned off, washed with water and then dried in vacuo, to yield 11.35 grams of *dl*-5-piperazin-1'-yl-10-dioxo-11-methyl-dibenzo (c,f) thiazepine (1,2) in the crude state, which melts at 162–183° C. (BK) and, after recrystallization from 25 ml. of absolute ethanol, yields 9.4 grams of base in the pure state melting at 182 to 184° C. (KB). The acid maleate corresponding to this base is prepared by mixing a solution of 2.89 grams of the above base in 13 ml. of ethanol with a solution of 1.04 grams of maleic acid in 3 ml. of ethanol and refluxing this mixture for 3 minutes. The reaction mixture is kept overnight in the refrigerator and the crystalline salt is then suctioned off, dried, and recrystallized from ethanol, to yield of 2.7 grams of the solid maleate of *dl*-5-piperazin-1'-yl-10-dioxo-11-methyl-dibenzo (c,f) thiazepine (1,2,), which melts instantaneously at 180° C. (BK).

Example 6: *dl*-5-[(4'-beta-hydroxyethyl) piperazin-1'-yl]-10-dioxo-11-methyl-dibenzo (c,f) thiazepine (1,2)

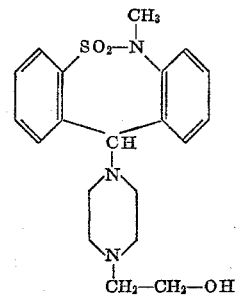

A well-agitated suspension of 6.8 grams of *dl*-5-piperazin-1'-yl-10-dioxo - 11 - methyl-dibenzo (c,f) thiazepine (1,2), 7 grams of dry sodium carbonate, and 1.5 grams of sodium iodide in 100 ml. of anhydrous acetone is mixed under reflux with a solution of 4 grams of chloroethanol in 20 ml. of anhydrous acetone.

The reflux temperature is maintained for 4 hours after completion of addition, and the batch is then evaporated to dryness under vacuum. The residue is washed with water and then extracted with chloroform. The chloroform solution is extracted with dilute hydrochloric acid. The acid waters are rendered alkaline with sodium hydroxide. The base is extracted with chloroform. The chloroform extract is washed, dried and evaporated. The oily residue is dissolved in boiling ethyl acetate, allowed to crystallize overnight, and then suction-filtered, to yield 4.2 grams of dl-5-[(4'-beta-hydroxyethyl)piperazin - 1'-yl]-10-dioxo-11-methyl-dibenzo (c,f) thiazepine (1,2), which melts instantaneously at 194° C. (BK).

Example 7: dl-5-(2'-diethylamino-oxyethyl)-10-dioxo-11-methyl-dibenzo (c,f) thiazepine (1,2)

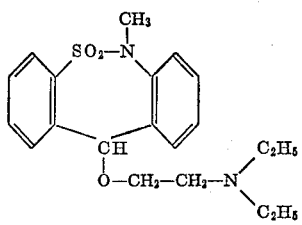

A solution of 5.85 grams of diethylaminoethanol in 10 ml. of dry toluene is added dropwise to a suspension of 6 grams of sodium hydride in a 20% oily suspension diluted with 20 ml. of anhydrous toluene, while maintaining the temperature between 0 and 5° C. The whole reaction mixture is then allowed to warm to room temperature with exclusion of moisture, whereafter 12.9 grams of 5-chloro-10-dioxo-11-methyl-dibenzo (c,f) thiazepine (1,2) are added dropwise.

After completion of addition, the batch is refluxed for 30 minutes and then evaporated to dryness under vacuum. The residue is taken up in 70 ml. of N hydrochloric acid and the insoluble matter filtered off. The acid aqueous solution is treated with carbon black, filtered, and the filtrate rendered alkaline. The oily base is extracted with ether and the organic layer washed with water, dried, and then evaporated to yield 9 grams of a crude, thick oil. Four grams of this oil are dissolved in 10 ml. of ethanol and mixed with 1.27 gram of fumaric acid in 25 ml. of hot ethanol. The whole reaction mixture is refluxed for 5 minutes, evaporated to dryness, and the residue crystallized from a mixture of acetone and ether, and recrystallized from ethanol to yield 2.65 grams of the acid fumarate of dl-5-(2'-diethylaminooxyethyl)-10-dioxo - 11 - methyldibenzo (c,f) thiazepine (1,2) which crystallizes with one molecule of ethanol and melts instantaneously at 100 to 105° C. (BK).

The following compounds were prepared by the same process:

(a) dl - 5 - (2' - dimethylamino-oxyethyl) - 10 - dioxo-11 - methyl - dibenzo (c,f) thiazepine (1,2), whose acid maleate melts instantaneously at 154° C. (BK), and whose iodomethylate hemihydrate decomposes around 150° C.

(b) dl - 5 - (3' - dimethylamino-oxypropyl)-10-dioxo-11 - methyl - dibenzo (c,f) thiazepine (1,3), whose acid maleate melts instantaneously at 140° C. (BK).

(c) dl - 5 - (5' - dimethylamino- - oxyamyl)-10-dioxo-11-methyl-dibenzo (c,f) thiazepine (1,2).

(d) dl - 5 - (2' - hexamethyleneamino-oxyethyl) - 10-dioxo-11-methyl-dibenzo (c,f) thiazepine (1,2).

(e) dl - 5 - (3' - piperidino-oxypropyl)-10-dioxo-11-methyl-dibenzo (c,f) thiazepine (1,2).

(f) dl - 5 - (2' - pyrrolidino-oxyethyl)-10-dioxo-11-methyl-dibenzo (c,f) thiazepine (1,2).

Example 8: dl-2-methoxy - 5 - (2' - dimethylamino-thioethyl) - 10 - dioxo-11-methyl-dibenzo (c,f) thiazepine (1,2)

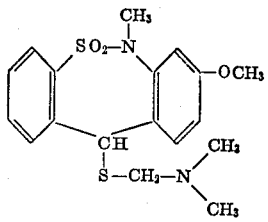

Three grams of dimethylamino-ethanethiolhydrochloride are added to a solution of 1 gram of sodium in 60 ml. of absolute ethanol.

While agitating the resulting suspension, there are added portionwise 6.48 grams of 2-methoxy - 5 - chloro-10-dioxo-11-methyl-dibenzo (c,f) thiazepine (1,2), keeping the temperature between 15 and 20° C. At the end of the addition, the whole reaction mixture is refluxed for 30 minutes, then evaporated to dryness under vacuum, and the residue taken up in 70 ml. of N/2 hydrochloric acid.

The hydrochloric acid solution is filtered and extracted with ether. The aqueous phase is rendered alkaline and the oil extracted with ether. The ethereal solutions are washed with water, dried and evaporated.

The crystalline residue consists of dl-2-methoxy-5-(2'-dimethylaminothioethyl) - 10 - dioxo - 11 - methyl-dibenzo (c,f) thiazepine (1,2), of which a sample on recrystallization from a mixture of ether, cyclohexane and benzene melts at 97–100° C. (MK).

A sample of 3.43 grams of the above crude base are dissolved in 7 ml. of ethanol and mixed with 1.04 grams of maleic acid in 7 ml. of ethanol. The mixture is refluxed for 5 minutes and then kept overnight in an icebox. After suctioning, drying and recrystallization from a mixture of 15 ml. of ethanol and 0.5 ml. of water, there are obtained 3.3 grams of the acid maleate of dl-2-methoxy-5-(2'-dimethylamino-thioethyl) - 10 - dioxo - 11 - methyl-dibenzo (c,f) thiazepine (1,2), which melts instantaneously at 166° C. (BK).

The following were produced by the same process:

(a) dl - 5 -(2' - dimethylamino - thioethyl)-10-dioxo-11 - methyl - dibenzo (c,f) thiazepine (1,2), whose acid maleate melts at 148–152° C. (BK).

(b) dl - 2 - chloro - 5 - (2' - dimethylamino-thioethyl)-10 - dioxo - 11 - methyl - dibenzo (c,f) thiazepine (1,2), whose acid maleate melts instantaneously at 147 to 148° C. (BK).

(c) dl - 5 - (2' - diethylamino - thioethyl)-10-dioxo-11 - methyl-dibenzo (c,f) thiazepine (1,2), whose acid maleate melts instantaneously at 146° C. (BK).

(d) dl - 2 - chloro -5 - (2' - diethylamino-thioethyl)-10 - dioxo - 11 - methyl - dibenzo (c,f) thiazepine (1,2), whose acid fumarate melts instantaneously at 190° C. (BK).

(e) dl - 2 - methoxy - 5 - (2' - diethylamino - thioethyl) - 10 - dioxo - 11 - methyl - dibenzo (c,f) thiazepine (1,2), whose acid maleate melts instantaneously at 145° C. (BK).

(f) dl - 5 - (2' - dimethylamino - thioethyl)-10-dioxo-11 - methyl-dibenzo (c,f) thiazepine (1,2), whose acid maleate melts instantaneously at 150° C. (BK).

(g) dl - 5 - (2' - dimethylamino - thioethyl) - 8 - chloro-10 - dioxo - 11 - methyl - dibenzo (c,f) thiazepine (1,2), whose acid maleate melts instantaneously at 150° C. (BK) with decomposition.

(h) dl - 5 - (2' - dimethylamino-thioethyl) - 7 - chloro-10 - dioxo - 11 - methyl-dibenzo (c,f) thiazepine (1,2), whose hydrochlorate melts instantaneously at 250° C. (BK) with decomposition.

(i) dl - 2,8 - dichloro - 5 - (2' - dimethylamino-thioethyl) - 10 - dioxo - 11 - methyl-dibenzo (c,f) thiazepine (1,2), whose hydrochlorate melts instantaneously at 160° C. (BK) with decomposition.

(j) *dl* - 3,8 - dichloro - 5 - (2' - dimethylamino-thioethyl) - 10 - dioxo - 11 - methyl-dibenzo (c,f) thiazepine (1,2), whose hydrochlorate melts at 160° C. with crystallization, and at 230° C. (BK) (water) with decomposition.

(k) *dl* - 3,8 - dichloro - 5 - (2' - dimethylamino-thioamyl) - 10 - dioxo - 11 - methyl-dibenzo (c,f) thiazepine (1,2).

(l) *dl* - 3,8 - dichloro - 5 - (2' - dimethylamino-thiopropyl)-10-dioxo - 11 - methyl-dibenzo (c,f) thiazepine (1,2).

The pharmacological study of the new compounds and their physiologically acceptable salts gives the following results:

The $LD_{50}$ studied by peroral administration in mice varies from 450 to 5,000 mg./kg. and from 250 to 2,000 mg./kg. by intraperitoneal administration for the different compounds.

Administered at a dose of 5 mg./kg. i.v. in the anesthetized dog, the compounds provoke a prolonged decrease of the blood pressure from 20 to 100 mm. Hg for more than 30 minutes.

At the same dose, the new compounds are able to inhibit the bronchospasm of the guinea-pig provoked by histamine, serotonine and acetylcholine.

A very pronounced diuretic action can be demonstrated in dogs with doses from 30 to 90 mg./kg. p.o. The increase of the urinary volume varies from 20 to 120%, with a corresponding increase of the elimination of the electrolytes.

The new compounds may be used in therapy, especially in the treatment of hypertension, hydroelectrolytic retention and bronchospasms. They can be administered in various pharmaceutical forms in association with different pharmaceutical solid or liquid carriers such, for example, as distilled water, lactose, talc, glucose, gum-arabic or ethyl cellulose. The doses may advantageously vary from 50 to 500 mg. in parenteral, rectal or oral administration.

Where the foregoing examples produce a compound having a methyl or other lower-alkyl group, it is to be understood that compounds containing other lower-alkyl groups of straight or branched nature and containing up to five carbon atoms inclusive, such as methyl, ethyl, propyl, isopropyl, butyl, sec.-butyl, t.-butyl, amyl, and isoamyl, are prepared in the same manner by substitution in the process of the appropriate different lower-alkyl starting material. Hydroxylower-alkyl radicals may carry primary, secondary, or tertiary hydroxyl groups and have the same carbon atom limit action as lower-alkyl. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, compounds having other lower-alkoxy groups containing various lower-alkyl groups having up to five carbon atoms inclusive are prepared in the same manner from the appropriate different lower-alkoxy starting material. Moreover, when one dilower-alkylamino group, such as the dimethylamino group, is present in a compound, other dilower-alkylamino compounds are prepared in the same manner starting only with the selected different dilower-alkylamino compound. In the same manner, ortho and meta substituted products are produced instead of the para by utilizing the selected ortho or meta substituted starting material, and vice versa. Similarly, other molecular changes within the scope of the invention are readily made.

The compounds of the invention are generally characterized by the pharmacological activity hereinbefore stated, making them useful in counteracting certain pathological abnormalities in a living animal body. Effective quantities of the pharmacologically active compounds of the invention may be administered to a living animal body in any one of various ways, for example, orally as in capsules or tablets, parenterally in the form of sterile solutions, suspensions, or by pellet implantation, and in some cases intravenously in the form of sterile solutions. Other modes of administration are cutaneously, subcutaneously, bucally, intramuscularly, and intraperitoneally.

As representative of living animal bodies which may be treated with the compounds and compositions of the invention, and according to the method of treating of the invention, for alleviation of the same and/or similar conditions as those described, may be mentioned the following: domestic animals such as dogs and cats, farm animals such as horses, cows, sheep, and goats, fur-bearing animals such as mink, seal, muskrat, fox, racoon, ermine, and weasel, and zoo animals such as bears, racoons, foxes, monkeys, baboons, and the like.

Pharmaceutical formulations are usually prepared from a predetermined quantity of one or more of the compounds of the invention, preferably in solid form. Such formulations may take the form of powders, elixirs, solutions, pills, capsules, pellets or tablets, with or without, put preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as low as 0.1 milligram, may be used in cases of administration to subjects having a relatively low body weight, unit dosages are usually five milligrams or above and preferably twenty-five, fifty, or one-hundred milligrams or even higher, depending of course upon the subject treated and the particular result desired, as will be apparent to one skilled in the art. Broader ranges appear to be one to 500 milligrams per unit dose. The active agents of the invention may be combined for administration with other pharmacologically active agents, such as analgesics, sedatives, tranquilizers, steroids or hormones, or the like, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established medical and/or veterinary principles.

For example, the compound *dl*-5-[(4'-methyl) piperazin-1'-yl]-10-dioxo-11-methyl - dibenzo (c,f) thiazepine (1,2), after chronic toxicity studies in laboratory animals, which showed a sufficient safety and no toxic effects on the organs, was administered perorally 2–3 tID in 100 mg. capsules to human patient suffering from asthma bronchiale during 15 days. All the patients showed a good therapeutic effect manifesting itself in an improvement of the respiration with good tolerance and no side effect. In 9 healthy volunteers, 200 mg. p.o. of the same product were able to inhibit bronchospasm provoked by inhalation of acetyl cholin.

It is to be understood that the invention is not to be limited to the exact details of operation or exact compounds, compositions, or procedures shown and described, as obvious modifications and equivalents will be apparent to one skilled in the art, and the invention is therefore to be limited only by the scope of the appended claims.

We claim:
1. A compound selected from the group consisting of (A) dibenzo (c,f) thiazepine (1,2) compounds of the formula:

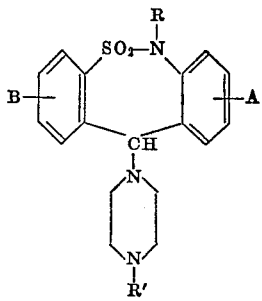

wherein
A is hydrogen, chloro or methoxy;
B is hydrogen or chloro;
R is lower alkyl having up to 5 carbon atoms, inclusive;
$R_1$ is selected from the group consisting of hydrogen, lower-alkyl or hydroxy-lower-alkyl having up to 5 carbon atoms, inclusive, pyrimidyl, benzyl, phenylethyl and phenylpropyl, and (B) physiologically acceptable salts thereof with organic or mineral acids.

2. A compound of claim 1 which is dl-5-[(4'-methyl) piperazin-1'-yl]-10-dioxo - 11 - methyl-dibenzo (c,f) thiazepine (1,2).

3. A compound of claim 1 which is dl-5-[(4'-ethyl) piperazin-1'-yl]-10-dioxo - 11 - methyl-dibenzo (c,f) thiazepine (1,2).

4. A compound of claim 1 which is dl-5-piperazin-1'-yl-10-dioxo-11-methyl-dibenzo (c,f) thiazepine (1,2). [

5. A compound of claim 1 which is dl-5-[(4'-butyl) piperazin-1'-yl]-10-dioxo - 11 - methyl-dibenzo (c,f) thiazepine (1,2).

References Cited
UNITED STATES PATENTS 3,509,154   4/1970   Fouche _____ 260—268 TR
3,657,276   4/1972   Malen et al. _____ 260—268 TR
3,700,663   10/1972  Weber _____ 260—268 TR

OTHER REFERENCES

Burger: Medicinal Chemistry, 2d ed., Interscience, 1960, p. 42.

DONALD G. DAUS, Primary Examiner

U.S. Cl. X.R.

260—256.5 R